Sept. 9, 1924.  1,507,814
E. C. COOLEY
CREAM LIFTER
Filed Dec. 27, 1921
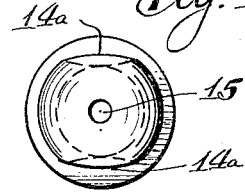
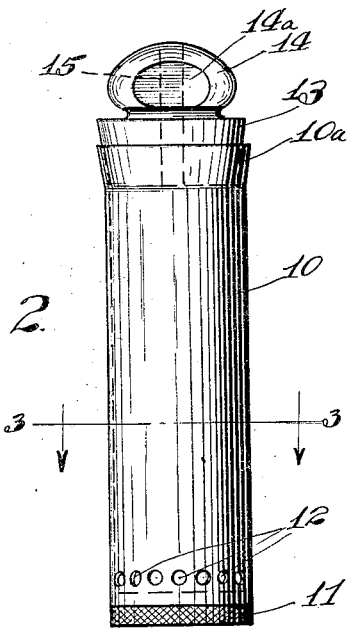
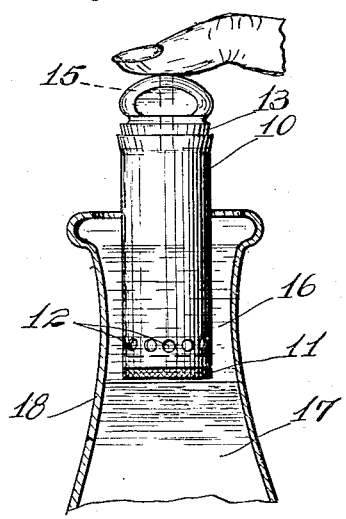
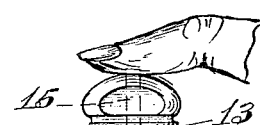
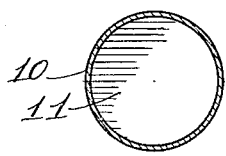
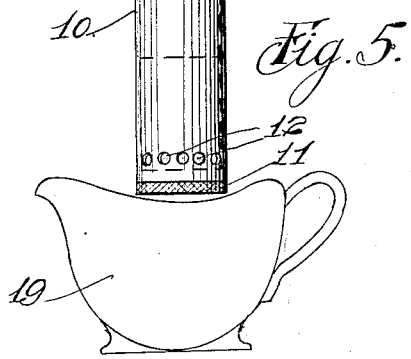
INVENTOR.
EDWARD C. COOLEY
BY Albert C. Bell
ATTORNEY.

Patented Sept. 9, 1924.

1,507,814

UNITED STATES PATENT OFFICE.

EDWARD C. COOLEY, OF ELGIN, ILLINOIS, ASSIGNOR TO ELGIN AUTO TOOL COMPANY, OF ELGIN, ILLINOIS, A CORPORATION OF ILLINOIS.

CREAM LIFTER.

Application filed December 27, 1921. Serial No. 524,950.

*To all whom it may concern:*

Be it known that I, EDWARD C. COOLEY, a citizen of the United States, residing at Elgin, in the county of Kane and State of Illinois, have invented a new and useful Improvement in Cream Lifters, of which the following is a specification.

My invention relates to an improved device for lifting or removing the cream collected on top of the milk in a milk container and particularly in connection with milk bottles of the ordinary construction in which the cream collects to a considerable depth at the top of the bottle. By my invention I provide a receptacle readily introduced in the neck of the bottle into which the cream may flow and in which it is retained by atmospheric pressure when the receptacle is removed from the bottle or milk container and from which receptacle it may readily be discharged by permitting air to enter the receptacle. My invention furthermore contemplates constructing such a receptacle in a manner permitting thoroughly cleaning the same, the parts being so constructed that there are no grooves or corners in which the cream or milk can lodge and from which it would be difficult to remove the same by the cleaning operation.

My invention will best be understood by reference to the accompanying drawings showing a preferred embodiment thereof in which—

Fig. 1 shows the device in top view,

Fig. 2 shows the device in side elevation,

Fig. 3 is a sectional view through the device shown in Fig. 2, taken along the line 3—3, Fig. 4 shows the device in use in the position it assumes in a milk bottle to remove the cream therefrom and Fig. 5 shows the device in the position it may be given to discharge its cream contents into a desired receptacle such as a cream pitcher.

Similar numerals refer to similar parts throughout the several views.

As shown in Figs. 1, 2 and 3 my improved cream lifter consists of a tubular shell 10 preferably of metal, as for example aluminum, in the lower end of which a shouldered plug 11 is inserted and which fits the lower end of the shell tightly enough to retain it in the shell while the device is in use, and loose enough to permit removing the plug from the shell by grasping the outer surface of the plug and turning it in the shell. The outer diameter of the plug is preferably substantially the same as the outer diameter of the shell and is preferably provided with a knurled or roughened surface to facilitate holding the same by the fingers in removing the plug from the shell. The plug 11 is imperforate and constitutes a bottom for the lifter when it is in position in the shell. Immediately above the upper surface of the plug 11 a plurality of apertures 12 are formed through the shell to permit the cream to readily flow into the shell and also to flow from the shell during the use of the device. While I do not limit myself to any particular size or number of these apertures it is however important that they shall be taken of a size such that the cream contained in the shell will not flow from the shell through said apertures until air is admitted to the upper end of the shell.

The upper end of the shell is flared outwardly slightly as indicated at 10$^a$ to engage a tapered plug 13 used to close the upper end of the shell, which tapered plug is provided with a projecting knob 14, preferably flattened on opposite sides as indicated at 14$^a$ to facilitate engaging the plug by the fingers to remove the same from the shell when desired. The plug 13 also has formed through it a hole 15 to permit air to escape from the shell or to enter the shell as desired, the upper end of the hole 15 being in convenient position to be covered by a finger of the person using the device.

In using the cream lifter the upper end of the shell 10 is grasped between the thumb and a finger of the user and with the hole 15 uncovered the shell is lowered into the cream 16 which collects above the milk 17 in a milk receptacle 18 as shown in Fig. 4, the milk receptacle as shown in said figure being a milk bottle of ordinary construction. Care should be used to avoid inserting the shell 10 far enough into the cream to bring the apertures 12 below the dividing line between the cream and milk and after the shell has been inserted in the cream as described it is left there for a moment to permit the cream to flow into the shell through the apertures 12 which action is permitted by the then open passageway or hole 15 which permits the air in the shell to escape. When the cream has reached the same level in the shell 10 as it has in the container 18, a finger of the user is placed over the upper end of the hole 15, thus preventing the passage of air into the shell and the device and the cream contained therein are lifted from the container 18 after which the device may be placed over any desired cream receptacle, as for example a cream pitcher 19 as indicated in Fig. 5, and the hole 15 is uncovered permitting air to enter the shell and permitting the cream to flow from the apertures 12 into the pitcher 19. The operation described may be repeated until practically all of the cream 16 is removed from the milk container 18.

After the cream lifter has been used it may be thoroughly cleaned by removing the plugs from the shell for which condition the shell may be thoroughly cleaned inside as it consists simply of an open tube and the plugs may be cleaned since all of the parts are accessible. In this manner the device is hygienic to the highest possible degree. The plugs may be made of any desired material but I prefer to construct them of metal as for example aluminum, so that the device may be light, durable, and not subject to attack by the cream or milk.

While I have shown my invention in the particular embodiment above described, it will be understood that I do not limit myself to this exact construction as I may employ equivalents known to the art at the time of filing of this application without departing from the scope of the appended claims.

What I claim is:

1. In a device of the class described, the combination of a tubular shell, an imperforate plug in one end of said shell, said shell having apertures therethrough adjacent the inner surface of said plug, and a second plug in the other end of said shell having a finger hold projecting therefrom and an aperture through said plug and finger hold.

2. In a device of the class described, the combination of a tubular shell, an imperforate plug in one end of said shell, said shell having apertures therethrough adjacent the inner surface of said plug, and a second plug in the other end of said shell having a finger hold projecting therefrom and an aperture through said plug and finger hold, said plugs being removable from said shell to facilitate cleaning the parts.

3. In a device of the class described, the combination of a tubular shell, an imperforate plug in one end of said shell, said shell having apertures therethrough adjacent the inner surfaces of said plug, and a second plug in the other end of said shell having a finger hold projecting therefrom and an aperture through said plug and finger hold, said plugs being held frictionally in said shell and readily removable therefrom.

4. In a device of the class described, the combination of a tubular shell, an imperforate plug in one end of said shell, said shell having apertures therethrough adjacent the inner surface of said plug, and a second plug in the other end of said shell having an aperture therethrough for controlling the flow of air into said shell.

5. In a device of the class described, the combination of a closed hollow shell adapted to be inserted into a milk container, said shell having apertures through its lower portion for permitting the flow of liquid into said shell, and an air passage for controlling the flow of air into and from said shell above the liquid, said shell being tubular and having opposite and removable closures to facilitate cleaning the parts.

6. In a device of the class described, the combination of a closed hollow shell adapted to be inserted into a milk container, said shell having apertures through its lower portion for permitting the flow of liquid into said shell, and an air passage for controlling the flow of air into and from said shell above the liquid, said shell being tubular and having opposite and removable closures to facilitate cleaning the parts, said closures comprising plugs held frictionally in said shell.

7. In a device of the class described, the combination of a circular tube having one end straight and the other end flared outwards slightly, a shouldered plug fitting the straight end of said tube and frictionally held therein and readily removable therefrom, the other surface of said plug being knurled to facilitate its removal and of substantially the diameter of the outer surface of said tube, said tube having apertures therethrough adjacent the inner surface of said plug, and a tapered plug fitting the flaring end of said tube and having an aperture therethrough.

8. In a device of the class described, the combination of a circular tube having one end straight and the other end flared outwards slightly, a shouldered plug fitting the straight end of said tube and frictionally held therein and readily removable therefrom, the outer surface of said plug being knurled to facilitate its removal and of substantially the diameter of the outer surface of said tube, said tube having apertures therethrough adjacent the inner surface of said plug, and a tapered plug fitting the flaring end of said tube and having an aperture therethrough and having a finger hold extending therefrom.

In witness whereof, I hereunto subscribe my name this 22nd day of December, A. D. 1921.

EDWARD C. COOLEY.